United States Patent [19]

Streib

[11] 4,101,231
[45] Jul. 18, 1978

[54] RELEASABLE ASSEMBLY OF STRUCTURAL MEMBERS

[76] Inventor: Albrecht Streib, Leinenweberstr. 67, 7000-Stuttgart, Fed. Rep. of Germany

[21] Appl. No.: 786,466

[22] Filed: Apr. 11, 1977

[30] Foreign Application Priority Data

Apr. 14, 1976 [DE] Fed. Rep. of Germany ....... 2616440

[51] Int. Cl.² .............................................. F16B 9/02
[52] U.S. Cl. ..................................... 403/252; 52/282; 52/584; 211/192; 248/222.1; 248/225.4; 403/322; 403/DIG. 7
[58] Field of Search ................. 52/584, 127, 282, 239, 52/738; 403/252, 322, DIG. 7, 264, 343; 248/225.4, 222.1; 211/192

[56] References Cited

U.S. PATENT DOCUMENTS

| 3,086,627 | 4/1963 | Bernard ................................ 52/738 |
| 3,486,287 | 12/1969 | Guillon ................................ 52/239 |
| 4,021,973 | 5/1977 | Hegg et al. .......................... 52/738 |

FOREIGN PATENT DOCUMENTS

| 2,255,491 | 7/1975 | France ................................ 403/264 |
| 2,504,476 | 8/1976 | Fed. Rep. of Germany ......... 52/282 |
| 2,239,370 | 3/1973 | Fed. Rep. of Germany ....... 403/264 |
| 1,775,802 | 8/1971 | Fed. Rep. of Germany ....... 403/252 |
| 1,054,320 | 2/1959 | Fed. Rep. of Germany ....... 403/252 |
| 93,366 | 10/1896 | Switzerland ........................ 403/252 |
| 442,870 | 1/1968 | Switzerland ........................ 403/252 |
| 1,091,328 | 11/1967 | United Kingdom .............. 248/225.4 |

*Primary Examiner*—Werner H. Schroeder
*Assistant Examiner*—Conrad L. Berman
*Attorney, Agent, or Firm*—Hans Berman

[57] ABSTRACT

Extruded bars or columns of a set of structural members are each formed with a central passage and with at least one longitudinal groove having a restricted orifice. A connector member has a body portion secured in the passage of one member and two catches mounted on the body portion and projecting into the groove of another member. One catch has a leading, enlarged head portion and a reduced neck portion trailing the head portion. An operating device on the body portion includes a single, manually operable drive shaft and two motion transmitting eccentrics respectively connecting the shaft to the two catches for moving the catches inward and outward of the groove orifice in timed sequence so that the neck portion of the one catch together with the other catch laterally secures the catches in the orifice while the enlarged head prevents accidental withdrawal of the catches from their locking position.

10 Claims, 8 Drawing Figures

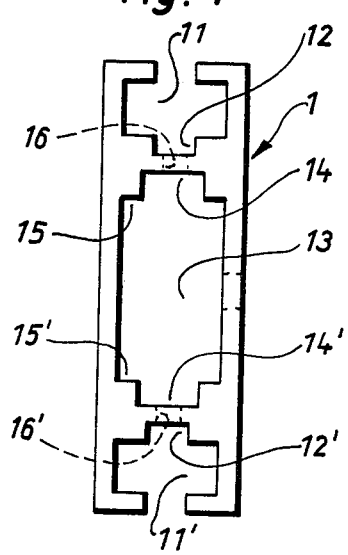
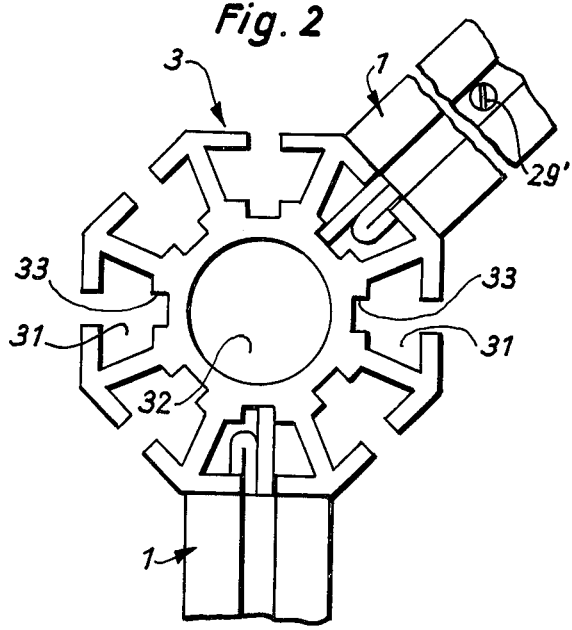
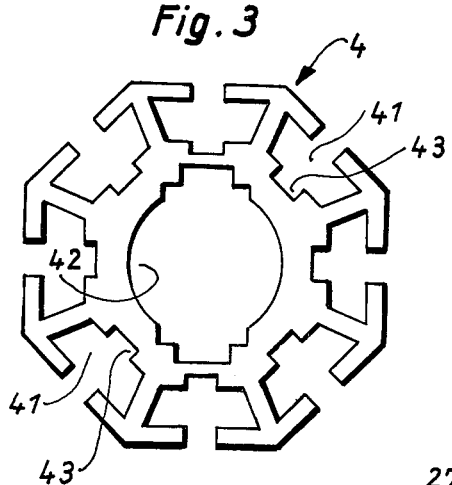
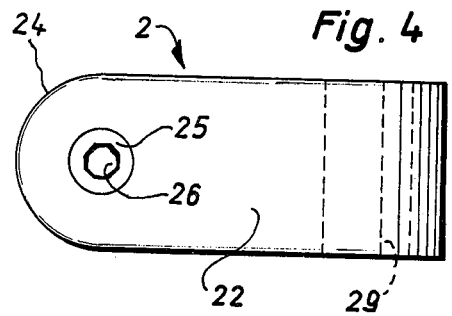
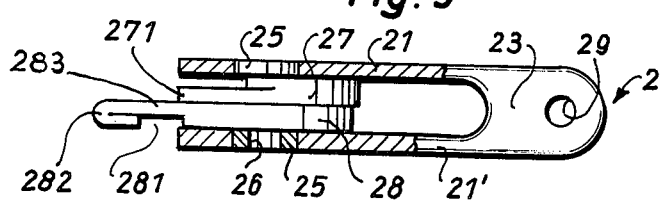
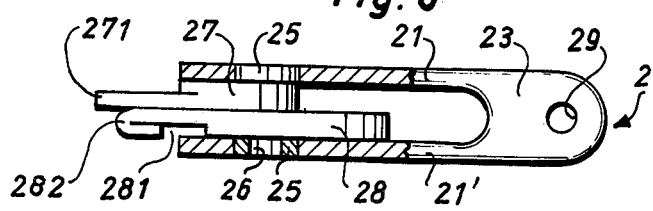

RELEASABLE ASSEMBLY OF STRUCTURAL MEMBERS

This invention relates to an assembly of releasably connected structural members, and particularly to an improvement in a connector and in cooperating parts of the connected structural members.

The invention will be described hereinbelow in its application to a skeleton frame assembly for a display device or for laboratory equipment, but it is useful in other fields as well as will presently become apparent.

It is known, for example, from the German patent application No. 1,775,802, laid open for opposition, to connect structural members of such a frame by means of a connector secured in an opening of one structural member and including catches which may be introduced into a longitudinal groove of another structural member through a restricted orifice and locked in the groove.

It is an object of this invention to provide an improved assembly of the general type described which is simple and sturdy so as to be capable of being produced at low cost.

Another object is the provision of an assembly whose component parts may be assembled into a rigid unit in a simple manner.

In its more specific aspects, the invention relates to an improvement in the known assembly which includes a first structural member formed with an opening and a second structural member formed with a groove having a restricted orifice, the groove and orifice being elongated. The assembly further includes a connector element which has a body portion, two catch members and an operating mechanism on the body portion for moving the catch members through the orifice of the groove in the second structural member into and out of locking engagement with the latter.

According to this invention, one of the catch members has an enlarged head portion which leads during movement of the catch member inward of the aforementioned groove, and a reduced neck portion adjacent the head portion in trailing relationship. The operating mechanism includes a single, manually operable drive member and motion transmitting means connecting the drive member to the two catch members for moving the catch members inward and outward of the afore-mentioned groove in timed sequence in such a manner that the one catch member leads to each catch member.

Other features, additional objects, and many of the attendant advantages of this invention will readily be appreciated from the following description of a preferred embodiment when considered in connection with the appended drawing in which:

FIG. 1 shows a structural bar of the invention in an end view;

FIG. 2 illustrates an assembly of the invention including two bars of the type shown in FIG. 1 connected to a column in fragmentary top plan view;

FIG. 3 illustrates a modified column for use in the assembly of FIG. 2;

FIG. 4 is a side-elevational view of elements of a connector in the assembly of FIG. 2;

FIGS. 5 and 6 show the connector in two different operating positions in top plan view;

Figure 7:
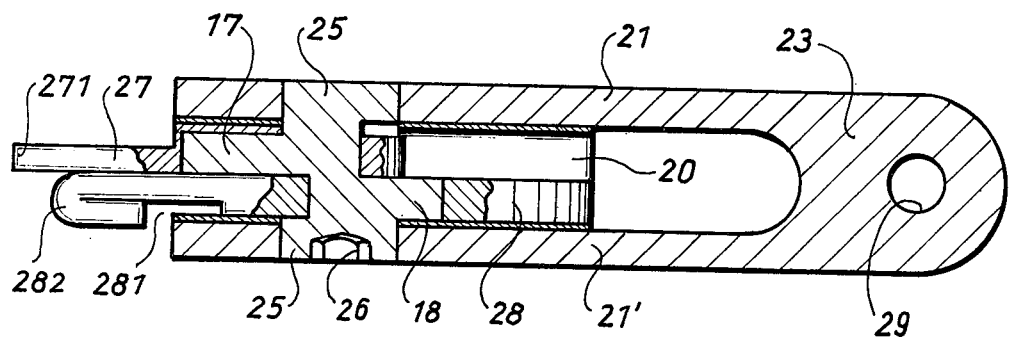
FIG. 7 shows the connector of FIG. 5 on a larger scale.

Referring now to the drawing in detail, and initially to FIG. 1, there is shown a flat bar 1 of extruded metal or plastic. Grooves 11, 11' extend over the entire length of the bar, at right angles to the plane of FIG. 1, in the narrow longitudinal faces of the bar. The grooves 11, 11' are of identical, rectangular cross section, and each groove has a restricted orifice whose uniform width is equal to that of an elongated recess 12, 12' in the bottom wall of the groove opposite the orifice. A central opening 13 provides a passage extending through the entire length of the bar 1. The passage is of generally rectangular cross section. Shoulders 15, 15' project from the corners of the rectangle and bound elongated recesses 14, 14' along the narrow walls of the passage 13 whose width is greater than that of the slots constituting the groove orifices. Threaded bores 16, 16' are located in the wall portions of the bar 1 which separate the recesses 12, 14 and 12', 14' from each other.

Figure 8:
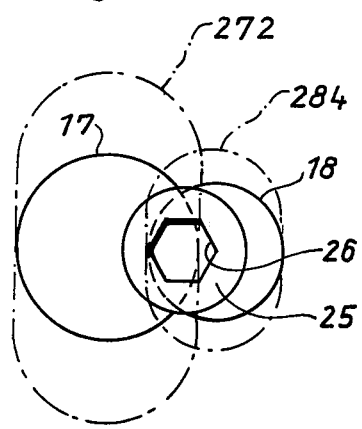
FIG. 8 shows elements of FIG. 7 in front elevation.

Two identical bars 1 are shown in FIG. 2 in horizontally assembled condition with an octagonal column 3. The column is a unitary extruded member having a central, cylindrical passage 32 and a groove 31 in each of its eight outer, longitudinal faces. The elongated orifice of each groove is restricted, and the bottom wall of each groove 31 has a longitudinal recess 33 opposite the orifice. The bars 1 are releasably fastened to the column 3 by means of identical connectors 2 of which one is shown in more detail in FIGS. 4 to 8.

The body portion of the connector 2 is a metal clip which is U-shaped in plan view so that it has two leg portions 21, 21' connected by a heavier bight portion 23. The outer face 22 of each leg portion is wider than the dimension of the connector at right angles to the face 22, and the end face of each face 22 remote from the bight portion 23 is rounded in a semicircle 24 about the axis of rotation of a short crank shaft 25 journaled in the leg portions 21, 21'. The width of the connector 2, as measured across the leg portions 21, 21', is about equal to the width of the recesses 14, 14', and the spacing of the two leg portions 21, 21' corresponds to the width of the grooves 12, 12' and of the restricted orifices of the grooves 11, 11'.

The shaft 25 carries two eccentric circular discs 17, 18 which are received in respective openings of two catches 27, 28, and which are offset 180° relative to the axis of the shaft. One end of the shaft 25 is accessible in the face 22 of the leg portion 21 and has a hexagonal recess 26 in which a mating wrench may be inserted for turning the shaft 25 and for thereby moving the catch members 27, 28 longitudinally of the leg portions 21, 21'.

The connector 2 fits closely between the four shoulders 15, 15' in the passage 13 of each bar and may be retained in the passage by a screw 29' passing through a bore 29 in the bight portion 23 parallel to the face 22. The screw is also received in the aligned, threaded bores 16, 16' of the bar 1.

An integral straight tongue 271 of the catch member 27 can be moved by the associated disc 17 between the retracted position of FIG. 5 and the extended position seen in FIG. 6 in which the tongue projects away from the bight portion 23 beyond the leg portions 21, 21'. A similar integral part of the catch member 28 has a notch 281 leaving an enlarged terminal head 282 connected to the main part of the catch member 28 by a reduced neck 283.

In assembling the structure shown in FIG. 2, the connector 2 is held against the orifice of a groove 31 in the column 3, and the shaft 25 is turned, the hook-shaped part 282, 283 of the initially retracted catch member 28 moves into the groove 31 whose orifice is wide enough to pass the enlarged head 282. The head 282 reaches the end of its stroke in the position shown in FIG. 5 when the notch 281 and the neck 283 are aligned with the narrow edges of the groove. Simultaneously, the tongue 271 starts moving into the groove orifice whose width is about equal to the combined widths of the tongue and of the neck 283. The notch 281 is long enough in the common direction of catch member movement to permit partial retraction of the head 282 before the tongue 271 starts moving back toward the shaft 25. At this stage, the catch members 27, 28 are positioned relative to the leg portions 21, 21' as is shown in FIG. 6.

As is seen in FIG. 2, the tongue 271 ultimately is held in abutting engagement with walls of the receiving groove 31 in the restricted orifice and in the recess 33 by the neck 283 while the head 282 abuts from inside the groove 31 and the end face 24 from the outside against the projecting edge portion of the column 3 which bounds the orifice in the groove, thereby clamping or locking the connector to the column 3. A bar 1 then is slipped over the body portion of the connector 2, and the connector is secured in the passage 13 of the bar by a screw 29', thus rigidly fastening the bar 1 to the column.

Because the end faces 24 of the leg portions 21, 21' extend in a circular arc about the axis of the drive shaft 25, a connector 2 may clamp a bar 1 to a column 3 not only at right angles to the direction of elongation of the column, but also obliquely, and the recesses 14 permit the catch members 27, 28 to be suitably inclined relative to the leg portions 21, 21'. A thin guide sleeve 20 shown only in FIG. 7 envelops the tongue 271 and the neck 283 and limits relative angular displacement of the catch members 27, 28 about the axis of the shaft 25 and longitudinal relative to the engaged groove 31 when the axes of the connected frame elements are obliquely inclined relative to each other. In rectangular frames, the catch members are adequately guided by the walls of the opening 13. The throw 272, 284 of each disc 17, 18 is indicated in broken lines in FIG. 8

The narrow longitudinal face of each bar 1 is as wide as each of the eight longitudinal faces of the column 3 so that up to eight bars 1 may be mounted on the same longitudinal portion of the column 3. Because each of the bars 1 is equipped both with a passage 13 dimensioned to receive the body portion of a connector 2 and with grooves 11, 11' dimensioned for locking engagement by the catch members 27, 28, one bar 1 may be clamped to another, identical bar in a manner obvious from FIG. 1. Instead of the cylindrical passage 32 of the column 3, the otherwise closely similar column 4 shown in FIG. 3 has a modified central passage 42 dimensioned and shaped for conformingly receiving the body portion of a connector 2 whose catch members 27, 28 may be engaged in the groove 41 and recess 43 of another column identical with that shown in FIG. 3.

What is claimed is:

1. In an assembly including a first structural member formed with an opening; a second structural member formed with a groove having a restricted orifice, said groove and said orifice being elongated; and a connector element having a body portion secured in said opening, catch means mounted on said body portion, and operating means on said body portion for moving said catch means through said orifice into and out of locking engagement with said second member, the improvement which comprises:

(a) said catch means including two catch members,
      (1) one of said catch members having an enlarged head portion leading during movement of said one catch member inward of said groove, and a reduced neck portion adjacent said head portion in trailing relationship; and
   (b) said operating means including
      (1) a single, manually operable drive member, and
      (2) motion transmitting means connecting said drive member to said two catch members for moving the catch members inward and outward of said groove in timed sequence,
      (3) said one catch member leading the other catch member during said moving.

2. In an assembly as set forth in claim 1, said drive member being mounted on said body portion for rotation about an axis, and said motion transmitting means including two eccentrics mounted on said drive member and engaging said catch members for moving the catch members in said timed sequence in response to said rotation of the drive member.

3. In an assembly as set forth in claim 1, said catch members being juxtaposed in a direction transverse to the direction of said inward movement, the combined width of said neck portion and of the other catch member in said transverse direction being substantially equal to the width of said orifice.

4. In an assembly as set forth in claim 3, said second structural member being formed with an elongated recess in said groove opposite said orifice, the width of said recess being substantially equal to said combined width.

5. In an assembly as set forth in claim 1, said body portion being of U-shaped section in a plane parallel to the direction of said movement and having two leg portions connected by a bight portion, said catch members being mounted between said leg portions, said drive member being a shaft journaled in said leg portions for angular movement about an axis.

6. In an assembly as set forth in claim 5, said catch members being formed with respective openings, and said shaft passing through said openings and carrying said motion transmitting means in said openings.

7. In an assembly as set forth in claim 6, said leg portions having respective end faces remote from said bight portion and rounded in circular arcs centered in said axis.

8. In an assembly as set forth in claim 7, said first member being formed with a recess in said opening, the width of said recess being equal to the combined width of said head portion and of the other catch member.

9. In an assembly as set forth in claim 5, guide means on said body portion for preventing angular displacement of said catch members about said axis relative to each other.

10. In an assembly as set forth in claim 5, said bight portion and said first structural member being formed with respective, aligned openings transverse to said inward movement, and a fastening member simultaneously received in the aligned openings.

* * * * *